UNITED STATES PATENT OFFICE.

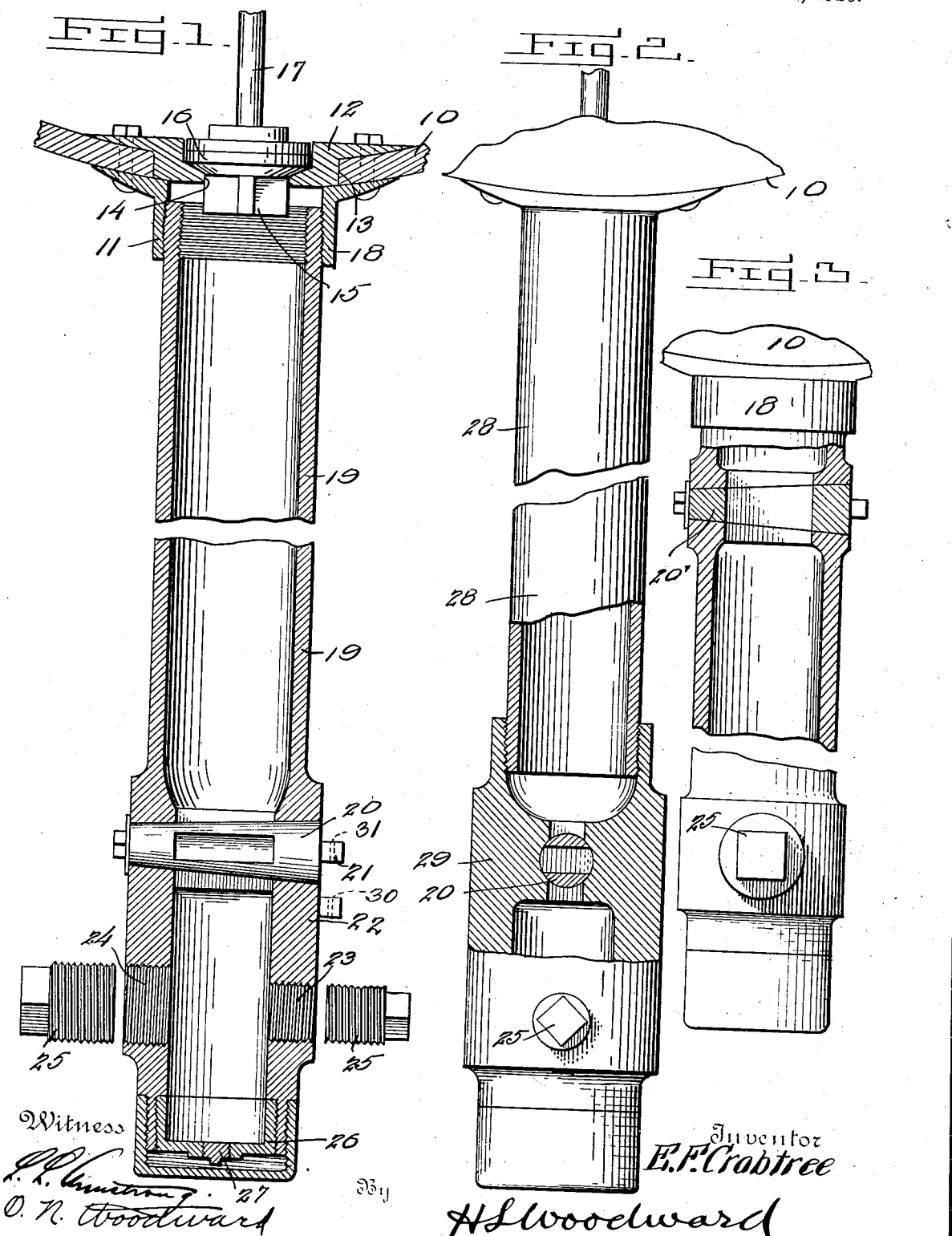

ELIHU FRANK CRABTREE, OF BALTIMORE, MARYLAND.

OUTLET-FITTING FOR TANKS.

1,171,706.  Specification of Letters Patent.  Patented Feb. 15, 1916.

Application filed July 20, 1915. Serial No. 40,923.

*To all whom it may concern:*

Be it known that I, ELIHU F. CRABTREE, a citizen of the United States, residing at Baltimore, in the State of Maryland, have invented certain new and useful Improvements in Outlet-Fittings for Tanks, of which the following is a specification.

The invention has for an object to give an appliance which will enable the satisfactory draining of tanks and at the same time will assure safety in the handling of the contents against waste in ways that are common at present with the appliances available in the art.

It is an important object to give a drain cock device so constructed as to greatly facilitate making of pipe connections of various standard sizes without requiring reducers or other fittings of a special size or character.

It is an important object to provide such an appliance that may be used on the ordinary drain fittings of tank cars and tanks of various kinds without special machine work or intermediate fittings.

It is a frequent experience of purchasers of large shipments of oil that when the outlet cap of a tank car is removed it is found that the inside valve has been displaced in some way, and the moment the cap is removed the contents of the tank begin to waste at a rapid rate. It is a very difficult matter to get the cap replaced, and practically impossible under ordinary circumstances, under such condition. My invention obviates the possibility of loss in this way.

The invention is especially useful for making pipe connections for tank cars since it can be accommodated to straight pipe connections of the usual sizes, because various firms have different sized pipe lines, depending on the size of their plant to a large extent, and tank cars may have different sizes of outlet nipples. It is frequently the case that a purchaser of a car of oil will be delayed many days in making connections because of the necessity for ordering from a distant point a reducer or other fitting necessary to accommodate a piping at hand to the outlet of the tank.

It is an important advantage of my invention that in those situations where only a small piping is available connections to a large sized nipple may be made without an L connection, greatly simplifying the work involved. It is a further advantage that these connections with a straight pipe may be made on any convenient radius of the nipple. The adjustment of the device for this purpose is also quite simple.

In the handling of certain grades of oil it is very often difficult to keep the passage through the nipple clear, and it is a very great advantage of my invention that the nipple may be blown out with steam or removed and burned out, without difficulty. It is an especial advantage that the nipple and pipe line may be blown out without being disconnected from the pipe line and without the steam coming into contact with the contents of the tank, which would be very objectionable on account of the frothing of the oil usually caused thereby.

With the usual valve within the tank in open position the pipe line may be disconnected or the nipple opened at its outer part without liability of loss of the contents of the tank. It is a further advantage of my invention that when the usual discharge valve is inoperative from the top of the tank as is often the case, it may be raised from the bottom through this safety cock without loss of the contents of the tank.

Other objects and advantages and features of invention will be apparent from the following description, and from the drawings, in which, Figure 1 is a sectional view of one embodiment of my invention upon a tank, Fig. 2 is a similar view of my invention as constructed for engagement with the ordinary nipples generally used on tanks, Fig. 3 is a detail of a further embodiment of the invention.

There is illustrated a portion of a tank 10 which may be of any kind, but in the present instance is such as used in tank cars. It includes as shown in Fig. 1 a base fitting 11, having a seat portion 12 presented through a suitable opening 13 in the tank, through the port 14 of which (the seat) there is extended downwardly the guide stem 15 of the usual valve 16 swiveled on the stem 17 which may be mounted in any desired way at the upper part of the tank, the details of such construction being familiar in the art and for that reason are not illustrated. The base 11 is formed with a suitable threaded sleeve 18 at its lower part of an interior diameter somewhat larger than that of the outlet caps generally used on tank cars. Removably engaged in this sleeve is the threaded upper end of a cock casting 19 of about the same length as the usual outlet nipple, in practice being made about thirty-five inches in length and of a mean diameter corresponding to that of extra heavy five inch pipe, the upper end having an interior diameter and threads suitable for engagement over the lower end of the regular outlet nipples of tank cars, in case that should be desirable, although for such use I prefer to make a shorter casting, as will be set forth.

At its lower part the casting is shaped and bored to receive a plug valve 20 having the usual key lug 21 projecting outwardly of the side of the casting 19, and by which the passage through the cock may be closed. The casting is continued below this valve a distance in cylindrical form, the wall being thickened as at 22. In these walls there are tapped various sized openings 23, 24, threaded to receive standard sizes of pipe, and normally closed by plugs 25, shaped to be removed with a wrench. The lower end of the casting is threaded on the inside to receive a four-inch bushing plug 26, while this plug is properly tapped to receive a one-inch plug 27 at its center. The opening 23 is preferably a two-inch one and the opening 24 is for three-inch pipe, and is concentric with the opening 23. The plugs are all in place, normally, and by removing the one corresponding to the size of pipe line to be laid from the tank, connections may be made in a simple manner with the ordinary stock equipment on hand in small plants. It will be apparent that the pipe line may be led directly from the cock without the use of an L when the openings 23 or 24 are used, and in order to avoid bending of pipe when the cock is not initially positioned suitably for making a straight line connection, the opposed plugs in the openings 23 and 24 may be removed, a wood lever or other bar inserted and the cock turned until the desired opening is presented in the proper direction. In the same way the cock may be removed for burning out without chain tongs or wrenches. The valve 20 being closed adjustments and connections may be made without closing the inside discharge valve of the tank, which usually requires considerable time and effort.

Tanks are very often discharged with the aid of steam or compressed air introduced into the tank in order to increase the rate of flow through the outlet by the pressure on the surface of the oil. Occasionally it is necessary to blow out or burn out the outlet nipple, even when such force is used, and with the ordinary equipment it is necessary to close the inside discharge valve. In order to close this valve access must be had to the interior of the tank, and this involves letting off all the pressure in the tank whereas with my appliance the closure of the cock will enable the blowing out of the nipple and pipe line without letting off pressure from the tank, saving a great deal of expense and much lost time, both in operating the inside discharge valve and also in raising the pressure in the tank. It will also be seen that it is not necessary to disconnect the pipe line from the nipple or cock in order to blow it out or to blow out the pipe line, as one of the plugs may be removed and steam connections made with the cock without disturbing the other connections.

Should an inside valve become detached from its stem, or otherwise inoperative by the usual means at the top of the tank, it may be unseated from below without loss of contents by inserting in my cock at the upper end a stick or rod long enough to project a short distance above the upper end of the casting, the plug valve being closed, and then screwing my appliance into place. This will push the valve upward, and none of the contents can escape until the plug in my cock is opened, which may be done after the desired connections have been made.

Where it is desired to apply my invention to tanks already in use and having the plain outlet nipple, I form the cock casting very short, as shown in Fig. 2, where the ordinary nipple is shown at 28, and the shortened casting for the cock at 29. The upper end of the casting in this case need not be threaded on the outside as it would not ordinarily be screwed into the base member 11 before mentioned; but it may be so used if desired. Except for the casting being shorter its construction otherwise is the same as before described.

In the first described form of the invention, it may be found desirable to locate the plug 20 at the extreme upper end of the casting, as shown at 20' in Fig. 3, and form at the lower end of the casting a head having the numerous connection elements as before described. It is possible to increase the number of plugged openings in the lower part of the casting, but the standard full inch sizes ordinarily used may be accommodated by the arrangement and construction shown.

In the event that the inside valve becomes displaced in transit my cock constitutes a safeguard against leakage, which is the cause of rejection of shipments by railroads frequently, where the ordinary fittings are employed, as the outlet cap is often left off, or when in place sometimes leaks when the inside valve is unseated. My valve is also a safeguard against waste from "empties" in which the outlet has been left open at the inner side, as but little effort is required to close my cock, while workmen are often not disposed to go to the trouble necessary to close the regular inside valve.

When the regular inside valve becomes inoperative from the top of the tank it is possible to insert a rod through the lower end of the cock while open, and push the inside valve off its seat and to one side, the rod being then quickly withdrawn and the cock closed, but little oil being wasted.

My invention is of great advantage when oil or other liquid is unloaded from a tank car to tank wagons, in small quantities, as the flow may be quickly cut off, and this is of great importance where road material is unloaded, making it possible to use steam or air pressure for the quickening of discharge, which would not be easily done with the ordinary equipment without connecting special cocks in the pipe line or on the nipple.

In order to permit sealing of the cock so that unauthorized opening of the cock may be detected, I form a small apertured lug 30 on the side of the cock casing adjacent the key lug 21 of the plug valve, in line with an opening 31 in the key lug when the valve is closed. An ordinary car seal may thus be used, as will be readily understood.

What is claimed:

1. The combination of a tank, an outlet fixture therein having an inner seat, a valve therefor, means to operate the valve through the interior of the tank, a cock portion including a casing, a valve therein spaced outwardly of the tank, means without the tank to operate the last named valve, said casing being extended outwardly of the last named valve and having a multiplicity of outlet openings of individually various standard sizes threaded to receive respective sizes of pipe, and respective plugs engaged in the openings.

2. An outlet fixture for tanks comprising a body casing having a duct passage therethrough, and having its inner end formed for connection with a tank, a valve intermediately of its length, a multiplicity of outlet openings therein outwardly of the valve of various individual sizes, the openings being threaded for engagement with different standard sizes of pipe, and respective closing plugs removably engaged therein.

In testimony whereof I have affixed my signature in presence of a witness.

ELIHU FRANK CRABTREE.

Witness:
W. R. BAUM.